(12) United States Patent
Rabinovitch et al.

(10) Patent No.: US 7,554,970 B2
(45) Date of Patent: Jun. 30, 2009

(54) SIMULATED ANNEALING FOR TRAFFIC MATRIX ESTIMATION

(75) Inventors: Peter Rabinovitch, Kanata (CA); Brian McBride, Stittsville (CA)

(73) Assignee: Alcatel Lucent, Paris (FR)

( * ) Notice: Subject to any disclaimer, the term of this patent is extended or adjusted under 35 U.S.C. 154(b) by 720 days.

(21) Appl. No.: 10/962,488

(22) Filed: Oct. 13, 2004

(65) Prior Publication Data

US 2006/0077907 A1 Apr. 13, 2006

(51) Int. Cl.
*H04L 12/66* (2006.01)
(52) U.S. Cl. ........................... 370/352; 370/229
(58) Field of Classification Search ................. 370/216, 370/229, 252–254, 352; 709/223
See application file for complete search history.

(56) References Cited

U.S. PATENT DOCUMENTS

| | | | | |
|---|---|---|---|---|
| 6,031,984 | A * | 2/2000 | Walser | 703/2 |
| 2004/0010577 | A1 * | 1/2004 | Yegenoglu | 709/223 |
| 2004/0049295 | A1 * | 3/2004 | Wojsznis et al. | 700/28 |
| 2004/0196837 | A1 * | 10/2004 | Cinkler | 370/352 |
| 2005/0097161 | A1 * | 5/2005 | Chiou et al. | 709/200 |
| 2005/0204320 | A1 * | 9/2005 | McGuffin et al. | 716/4 |

FOREIGN PATENT DOCUMENTS

EP 1798894 A1 * 6/2007

OTHER PUBLICATIONS

Zhang, Y., et al., Tomo-Gravity, ACM Sigmetrics, 2003.

* cited by examiner

*Primary Examiner*—Kwang B Yao
*Assistant Examiner*—Andrew Lai (57) ABSTRACT

The SATME method and system estimates source-to-destination traffic matrices using a simulated annealing algorithm, the traffic matrix estimation being represented as a probability distribution over the set of all possible matrices that satisfy a set of given constraints. The constraints explicitly encode information that the user knows about the network traffic as components of an objective function (a fitness function), that is then minimized using simulated annealing. With the method according to the invention, arbitrary constraints of any form can be included, and the case where there are no feasible solutions can be diagnosed by the objective function not converging to zero.

2 Claims, 6 Drawing Sheets

Link traffic table

| From/To | N1 | N2 | N3 | N4 | N5 | Total |
|---|---|---|---|---|---|---|
| N1 | 0 | 13 | 0 | 6 | 0 | 19 |
| N2 | 15 | 0 | 17 | 7 | 0 | 39 |
| N3 | 0 | 21 | 0 | 16 | 23 | 60 |
| N4 | 5 | 4 | 13 | 0 | 0 | 22 |
| N5 | 0 | 0 | 21 | 0 | 0 | 21 |
| Total | 20 | 38 | 51 | 29 | 23 | 161 |

FIGURE 3a

Traffic Path

| From/To | N1 | N2 | N3 | N4 | N5 |
|---|---|---|---|---|---|
| N1 | 0 | 1→2 | 1→2→3 | 1→4 | 1→2→3→5 |
| N2 | 2→1 | 0 | 2→3 | 2→4 | 2→3→5 |
| N3 | 3→2→1 | 3→2 | 0 | 3→4 | 3→5 |
| N4 | 4→1 | 4→2 | 4→3 | 0 | 4→3→5 |
| N5 | 5→3→2→1 | 5→3→2 | 5→3 | 5→3→2 | 0 |

FIGURE 3b

Connections Table (Source to Destination)

| From/To | N1 | N2 | N3 | N4 | N5 |
|---------|----|----|----|----|----|
| N1 | $m_{11}$ | $m_{12}$ | $m_{13}$ | $m_{14}$ | $m_{15}$ |
| N2 | $m_{21}$ | $m_{22}$ | $m_{23}$ | $m_{24}$ | $m_{25}$ |
| N3 | $m_{31}$ | $m_{32}$ | $m_{33}$ | $m_{34}$ | $m_{35}$ |
| N4 | $m_{41}$ | $m_{42}$ | $m_{43}$ | $m_{44}$ | $m_{45}$ |
| N5 | $m_{51}$ | $m_{52}$ | $m_{53}$ | $m_{54}$ | $m_{55}$ |

FIGURE 4

Link-Connection Table

| Link | Connection |
|------|------------|
| $10_{12}$ | C12, C13, C15 |
| $16_{14}$ | C14 |
| $10_{21}$ | C21, C31, C51 |
| $12_{23}$ | C13, C15, C23, C25 |
| $18_{24}$ | C24 |
| $12_{32}$ | C31, C32, C51, C52 |
| $14_{34}$ | C34, C54 |
| $20_{35}$ | C15, C25, C35, C45 |
| $16_{41}$ | C41 |
| $18_{42}$ | C42 |
| $14_{43}$ | C43, C45 |
| $20_{53}$ | C51, C52, C53, C54 |

SIMULATED ANNEALING FOR TRAFFIC MATRIX ESTIMATION

FIELD OF THE INVENTION

The invention is directed to the estimating performance of communication networks and in particular to a simulated annealing method and system for traffic matrix estimation (SATME).

BACKGROUND OF THE INVENTION

Spurred by technological advances, the telecommunications industry has experienced tremendous growth over the last decade. The advances in processing power of desktop computers and the decrease in applications response times fostered corresponding improvements in the network infrastructure. The new bandwidth consuming applications supported the network traffic growth and the rapid change in equipment utilization confront the network providers with the issue of whether the network has adequate capacity to support the current and the future traffic requirements.

In any traffic and/or network engineering task, more knowledge about the network can only be beneficial. Specific applications require for example knowledge of how much traffic goes from a site A to a site B, how much traffic does a particular customer sends from site A to B, where is the hot spot in the network, or how much capacity needs to be added and where. Information about network behaviour under specific conditions is also useful. For example, a network provider may optimize network performance based on the knowledge of how much traffic has to be moved if a link fails, what happens if traffic between two points is moved from a link to another, is most traffic originating in a sub-network (autonomous system, country, or company) staying in that sub-network or not, etc. This knowledge is used generally for routing path calculations, load balancing, etc.

Network engineering tools were designed for handling these issues created by the increases in traffic demands or changes in the existing demands and determining the necessary expansion or modification to the network to support the projected traffic. These tools generally aid in revising network designs and routing schemes to avoid traffic bottlenecks, enable differential pricing of services, etc. However, all these tools require knowledge of traffic statistics, and more specifically of the real time source-destination traffic demands.

A way of keeping these statistics for a packet based network is to look at each packet and record its source and destination. However, this method requires huge tables for recording this information. Furthermore, if what is desired is a source to destination traffic matrix for a subset of the network, then the ingress into the subset and the egress from the subset will not be available without looking at the source and destination addresses and then determining the path the packet would take as indicated by the routing information. This would be infeasible for large networks and large numbers of packets.

It is also known to organize the traffic statistics into a "traffic matrix". A traffic matrix is typically expressed as the total bytes of data or the total number of packets or connections between all of the source-destination pairs of nodes. While the current routers are able to measure the counts for the incoming and outgoing traffic at each interface (incoming and outgoing links), it is generally impossible to derive the traffic matrix from the link counts with mathematical certainty. The best that can be done is to make a probabilistic inference concerning the traffic matrix from the observed link traffic.

AT&T proposed to infer traffic matrices from the available measurements of link loads, by combining two known models, namely the gravity model with the tomographic model. The gravity model assumes that the traffic between the sites is proportional to the traffic at each site on per peer basis (as opposed to per router basis) for the outbound traffic, and that there is no systematic difference between the traffic in different locations. The tomographic model applies link constraints based on models. The combination of these models reduces the problem size for large networks and provides more accurate results that the gravity and tomographic models separately.

However, the tomo-gravity method does not allow for easy specification of arbitrary constraints, such as knowing that if a link is twice the speed of another, it probably has roughly twice the traffic. Also, this method is based on assuming that the traffic follows the 'gravity' model, which can not be assumed in practice.

The prior art techniques described above, such as monitoring all packets and gravity, tomographic approach and tomo-gravity, are not satisfactory for large traffic volumes and rely on unrealistic assumptions, respectively. On the other hand, it is essential to provide tools and techniques for traffic engineering in modem communication networks, particularly for estimating traffic patterns (characteristics), e.g. traffic volumes, hotspots, effects of failures, etc.

SUMMARY OF THE INVENTION

It is an object of the invention to provide tools and techniques for traffic engineering that alleviate totally or in part the drawbacks of the prior art tools and techniques.

In particular, it is an object of the invention to estimate source-to-destination traffic matrices using a simulated annealing algorithm, the traffic matrix estimation being represented as a probability distribution.

Accordingly, the invention provides a method for estimating a traffic matrix for a communication network based on measured link counts, comprising the steps of; a) establishing a fitness function for the respective network; b) generating a starting source to destination (SD) traffic matrix and calculating a starting value of the fitness function for the starting SD traffic matrix; c) modifying the starting matrix to obtain a randomly modified SD traffic matrix and calculating an updated value of the fitness function for the randomly modified SD traffic matrix; d) selecting the SD traffic matrix corresponding to the less of the starting value and the updated value as a temporary SD traffic matrix; e) changing the temporary SD traffic matrix using a simulated annealing algorithm, until the fitness function of the temporary SD traffic matrix reaches a minimum; and f) selecting the temporary SD traffic matrix estimated in step e) as a potential SD traffic matrix and repeating steps b) to e) for a pre-selected number of times.

The invention also provides a system for estimating a traffic matrix for a communication network. The system comprises: a source to destination (SD) traffic matrix generator for generating a starting SD traffic matrix based on network configuration data and on link counts collected for each link of the network; a random number generator for randomly altering the starting SD traffic matrix to obtain a randomly modified SD traffic matrix SD traffic matrix; a fitness function calculating unit for determining a starting fitness function and an updated fitness function for said respective SD traffic matrices and selecting the SD traffic matrix corresponding to the less of the starting value and the current value as a temporary SD traffic matrix; and a simulated annealing (SA) algorithm processor for changing the temporary SD traffic matrix until the fitness function of the temporary SD traffic matrix reaches a minimum, and selecting the SD traffic matrix corresponding to the minimum as a potential SD traffic matrix.

Advantageously, the invention requires no assumptions about the traffic, i.e. it allows the user to specify prior information about the network and traffic flows in a simple manner.

Furthermore, the invention provides not just a point estimate of each element, but rather a probability distribution over all possibilities, so that the variation of the possibilities and the correlations between traffic on different links can be assessed.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

Simulated annealing is an optimization technique developed for metallurgical processes, whereby a control parameter is used to model the temperature of an oven during annealing. The control parameter, hence called temperature (T), is set to an initial value and is lowered over time, according to a predetermined schedule.

Basic simulated annealing is successfully used for example in VLSI physical design, which is explained here in general term for a better understanding of the algorithm. A change to an initial configuration is made by moving a component or interchanging locations of two components; the placement is changed randomly to get a new placement. The control parameter T indicates the probability of accepting moves (shuffles) that result in increased cost. After the shuffle, the cost of the new placement is evaluated and if there is a decrease in cost, the configuration is accepted. Otherwise, the new configuration is accepted with a probability that depends on T. T is then lowered using, for example, an exponential function, and the process is stopped when T reduces to a very low value which requires that only moves that reduce costs are to be accepted. The algorithm starts with a very high value for T that gradually decreases so that shuffles that increase cost have a progressively lower probability of being accepted. In this way, the algorithm converges to an optimal, or near optimal configuration.

This technique is also applied to the frequency assignment in cellular networks. However, it not a straight-forward task to apply this mechanism to communication networks. A serious problem with the inhomogenous networks is that the simulated annealing algorithm becomes trapped by an overwhelming number of local minima in the search. Once the algorithm is trapped in a poor minimum of the search space, the chance of randomly escaping the minimum is low.

The main idea of the present invention is to adapt the simulated annealing algorithm to communication networks with a view to generate a traffic matrix estimation represented as a probability distribution. Advantages of the solution are that it requires no assumptions about the traffic (i.e. it allows the user to specify prior information about the network and traffic flows in a simple manner) and the estimation matrices enable assessment of variations over all possibilities as well as correlations between elements.

The SATME (simulated annealing for traffic matrix estimation) method according to the invention is used in a different way than the simulated annealing.

The main difference is that the simulated annealing algorithm determines a (close to) optimal solution of an objective function, whiled what is needed for traffic matrix estimation is a uniform distribution over the set of all possible tables that satisfy a set of given constraints. The reason for requiring a uniform distribution over the possibilities is so as to not bias the potential answers. Since there are many possible traffic matrices that will satisfy the given link counts, a single answer as provided by directly applying the SA algorithm is inaccurate. Ideally, the method should provide the most likely traffic matrix, as well as some measure of its variability. These are both possible to calculate from the information provided by the invention.

Another adaptation added to the SA algorithm as known is the use of constraints. According to the invention, information that the user knows about the network traffic is explicitly encoded as constraints. The constraints are encoded as components of an objective function (or energy), that is then minimized using simulated annealing. With the method according to the invention, arbitrary constraints of any form can be included, and the case where there are no feasible solutions can be diagnosed by the objective function not converging to zero.

Figure 1:
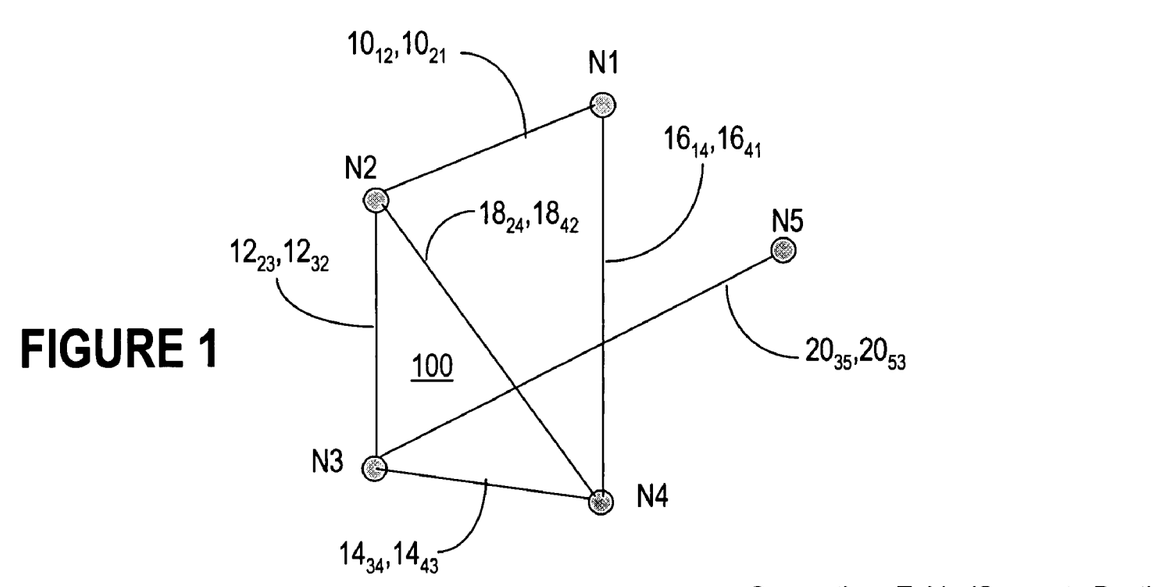
FIG. 1 is a simple example of a network used to illustrate the invention.

FIG. 1 shows a simple example of a network 100 used to illustrate the invention. This network has five nodes N1-N5, which are connected over links 10, 12, 14, 16, 18 and 20 as shown. More particularly, since the traffic is bidirectional, indices are associated with the reference numeral identifying a certain link to reflect also the direction. Thus, for the link between nodes N1 and N2, $10_{12}$ is used for the direction from node N1 to N2, and $10_{21}$ is used for the direction from node N2 to N1. The term 'connection' is used here for the end-to-end (source-to-destination) traffic and is referred to here using letter C followed by the numbers of the connected node. For example, a connection between nodes N1 and N5 is denoted with C15.

A connection may be routed along a plurality of paths. For example, network 100 may route the traffic originating at node N1 and destined to node N4 (i.e. connection C14) along a path consisting of links $10_{21}$, $12_{23}$ and $14_{34}$, or along a path consisting of link $16_{14}$ alone. Selection of the path (also referred to as an end-to-end route) for a connection is made by the routing algorithm used by the network. As most networks use a shortest path algorithm, in the above example the N1-N4 traffic will be routed along link $16_{14}$.

Figure 2:
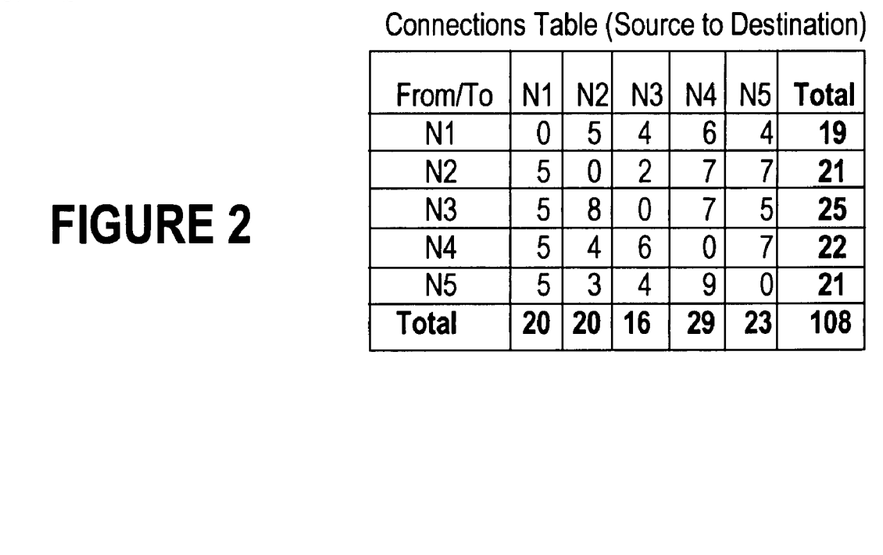
FIG. 2 is a source-to-destination (SD) matrix showing an example of the connections currently established across the network of FIG. 1.

FIG. 2 is a connections table, also referred to as a Source-Destination (SD) table (or matrix), showing an example of all connections currently established between nodes N1 to N5 over network 100 of FIG. 1. As seen, the connections are bidirectional; for example the number of connections from node N1 to node N5 (C15) is 4, and the number of connections from node N5 to node N1 (C51) is 5. The total for the connections leaving a respective node (outgoing connections) is provided in the last column and the total number of connections received by a respective node (incoming connections) is provided in the last row of the connections table. In this example, node N1 sources 19 connections and terminates 20 connections.

Figure 3A:
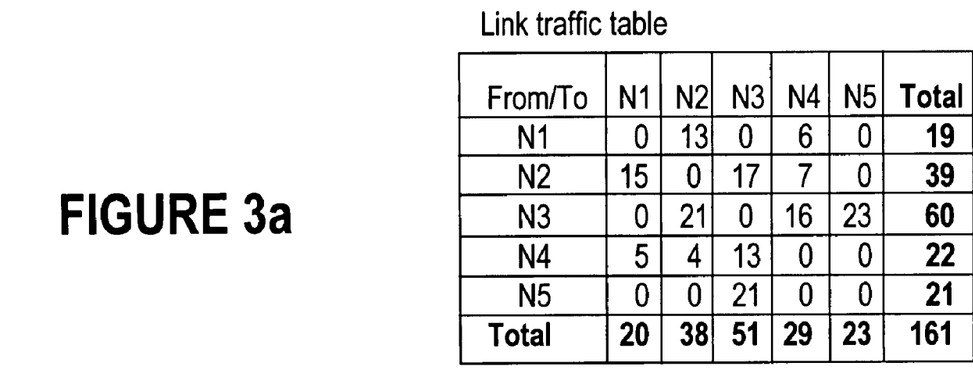
FIG. 3a is a link traffic table for a network configuration as in FIG. 1 with source-destination connections as in FIG. 2.

FIG. 3a is a link traffic table showing how network 100 may route the connections (along which particular links), assuming that the network uses a shortest path routing algorithm. For the example provided in FIG. 2, link $10_{12}$ carries 13 connections, namely 5 C12 connections (between N1 and N2), 4 C13 connections (between N1 and N3) and 5 C15 connections (between N1 and N5). As another example, link $20_{35}$ carries 23 connections, namely 4 C15 connections (between N1 and N5), 7 C25 connections (between N2 and N5), 5 C35 connections (between N3 and N5) and 7 C45 connections (between N4 and N5).

The last column of link traffic table provides the total number of connections along a link in one direction, including the by-pass connections and the connections sourced by the node for the respective direction. The last row provides the total number of connections entering a node, including the connections for the other direction by that node and those forwarded to other nodes. These numbers are referred here as the 'link counts'.

Figure 3B:
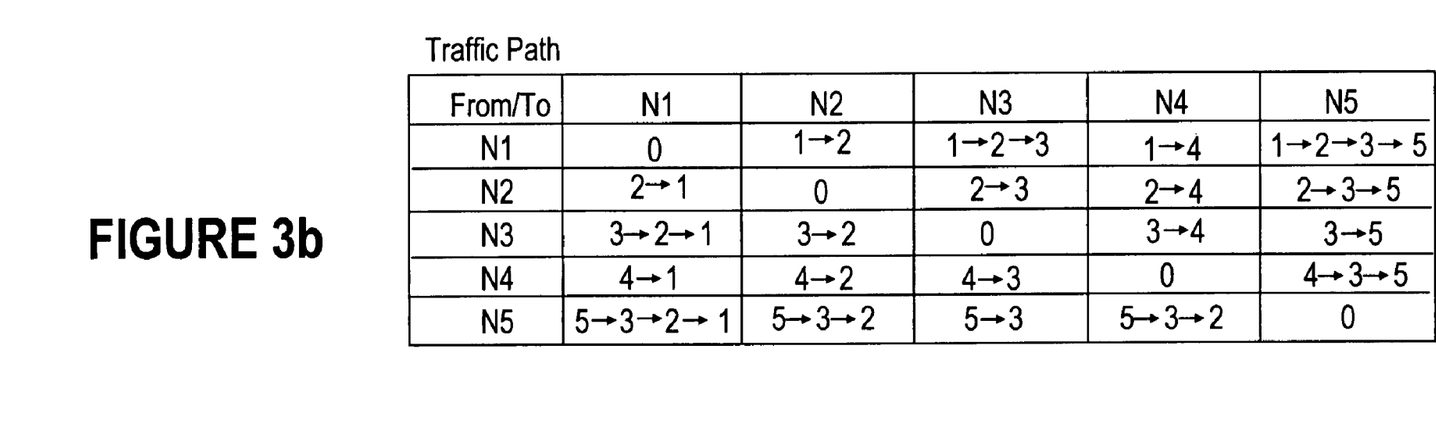
FIG. 3b shows explicitly the path followed by each connection on each link of the network of FIG. 1 for the SD matrix of FIG. 2.

The topology of network 100 (see FIG. 1) and the shortest path routing imply that the traffic follows the paths as shown in FIG. 3b. For example, connection C51 is served by a path from node N5 to node N3 (along link $20_{53}$), from node N3 to node N2 (along link $12_{32}$) and from node N2 to node N1 (along link $12_{21}$).

Figure 3C:
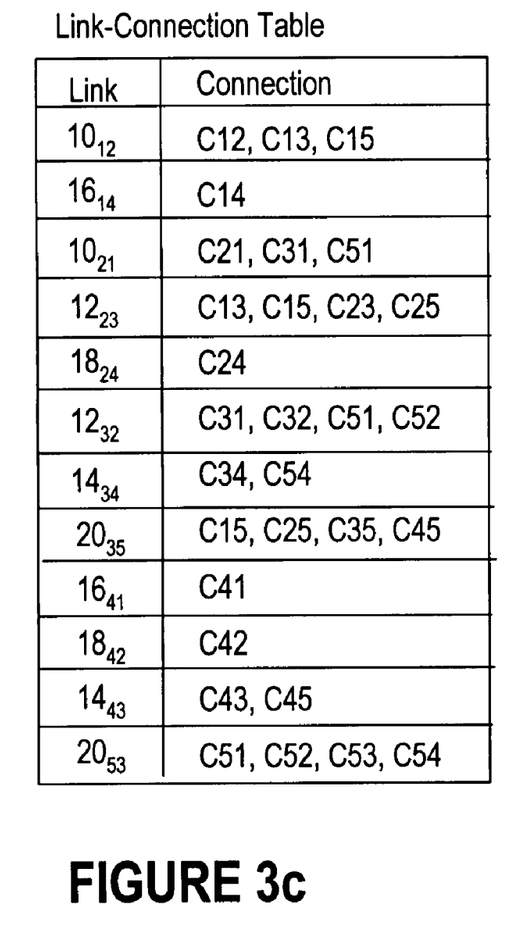
FIG. 3c illustrates a link connection table for the network of FIG. 1, for the SD matrix of FIG. 2.

'Inverting' this information, provides what traffic is following over each link, which is shown in FIG. 3c. This table also provides in fact the source-destination pair (connection) that uses the respective link.

As discussed above, the link counts information is available in modern networks; however, the source-to-destination information is not. The link counts are used according to the invention to establish the source-to-destination traffic matrix, by adapting the SA method to the link traffic matrix problem. In other words, the method according to the invention exploits the SA's ability to explore a region of the constraint space.

Since there are many possible source-to-destination traffic matrices that could generate the link counts shown in FIG. 3a, some characterization of the distribution of the possibilities may be used to restrict the number of solutions. Specifically, the invention uses a plurality of constraints as penalties, and then seeks a solution that minimizes the sum of the penalties. Again, there are many solutions that satisfy the constraints, but what is searched for is in essence a uniform distribution over all these possibilities.

Figure 4:
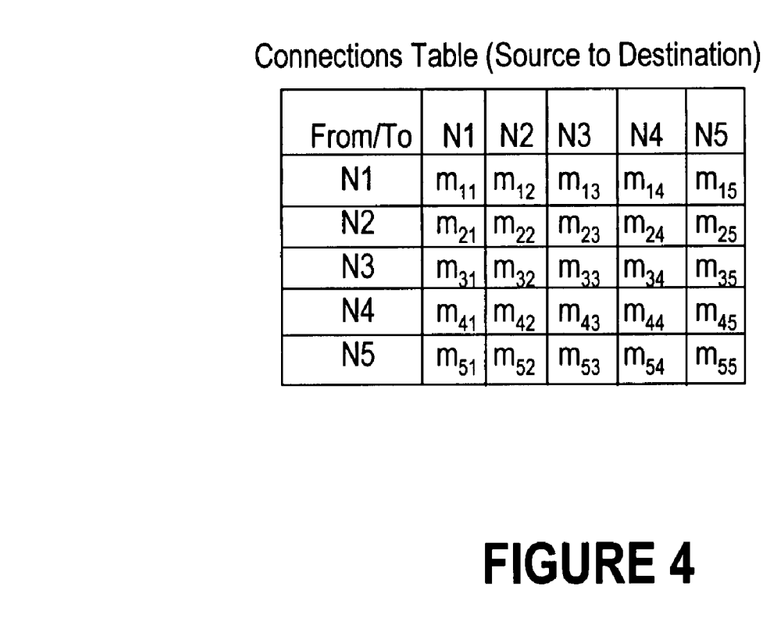
FIG. 4 shows a SD matrix for the network of FIG. 1, where the number of connections is to be determined.

FIG. 4 shows a SD matrix for the 5-node network of FIG. 1, where the number of connections is to be determined; they are denoted with 'm' followed by an index for the respective source-destination node pairs. For example, $m_{54}$ represent the number of connections between nodes N5 and N4. The idea is to determine the elements of the SD matrix (the original SD matrix) using SA algorithm in a specific way and also using constraints that represent various components of the problem.

The constraints are classified into two categories, namely absolute and soft constraints. The hard constraints are the most important constraints that account for the actual traffic (number of packets and bytes) seen art each ingress or egress point, in other words the link counts which are observed values of the link traffic. Other hard constraints represent routing rules, such as the shortest path routing or any pre-specified path. Soft constraints may for example represent an a priori knowledge about the network, such as specific links typical service twice the traffic of another.

In order to clarify how the application of SA works according to the invention, the example network of FIG. 1 is again used, in combination with the link traffic table of FIG. 3a. The first absolute constraint for any network is that no connection may originate and terminate on the same node. For this particular example (5 nodes), this absolute constraint is expressed as shown below:

$$m_{11}=m_{22}=m_{33}=m_{44}=m_{55}=0$$

The following absolute constraints resulted from the total number of connections per link, provided with the example of FIG. 3a.

The total amount of traffic leaving node N1 is 19.
The total amount of traffic leaving node N2 is 39.
The total amount of traffic leaving node N3 is 60.
The total amount of traffic leaving node N4 is 22.
The total amount of traffic leaving node N5 is 21.
The total amount of traffic arriving at node N1 is 20.
The total amount of traffic arriving at node N2 is 38.
The total amount of traffic arriving at node N3 is 51.
The total amount of traffic arriving at node N4 is 29.
The total amount of traffic arriving at node N5 is 23.

The above absolute constraints must be met, and therefore a very costly penalty is associated with violating them. To this list, much 'softer' constraints may be added, i.e. constraints that have a smaller penalty. Let's say for example that the traffic on link $10_{12}$ should be the same as the traffic on link $14_{43}$.

$$m_{12}=m_{43}$$

Combined with the absolute constraints, this gives the following equations that may be used to determine the elements of the SD matrix.

A. The absolute constraints:

$$m_{11}=m_{22}=m_{33}=m_{44}=m_{55}=0$$

$$m_{12}+m_{13}+m_{15}+m_{14}=19$$

$$m_{21}+m_{31}+m_{51}+m_{13}+m_{15}+m_{23}+m_{25}+m_{24}=39$$

$$m_{31}+m_{32}+m_{51}+m_{52}+m_{34}+m_{54}+m_{15}+m_{25}+m_{35}+m_{45}=60$$

$$m_{41}+m_{42}+m_{43}+m_{45}=22$$

$$m_{51}+m_{52}+m_{53}+m_{54}=21$$

$$m_{21}+m_{31}+m_{51}+m_{41}=20$$

$$m_{12}+m_{13}+m_{15}+m_{31}+m_{32}+m_{51}+m_{52}+m_{42}=38$$

$$m_{13}+m_{15}+m_{23}+m_{25}+m_{43}+m_{45}+m_{51}+m_{52}+m_{53}+m_{54}=51$$

$$m_{14}+m_{24}+m_{34}+m_{54}=29$$

$$m_{15}+m_{25}+m_{35}+m_{45}=23$$

B. And, the soft constraint for the above example is:

$$m_{12}+m_{13}+m_{15}=m_{43}+m_{45}$$

Next, weights (or penalties) are assigned to violations of these constraints. A large penalty is assigned to the absolute constraints listed above under A, say $p_1=100$; and a smaller penalty is assigned to the soft constraint at B, say $p_2=25$.

The constraints are used to create a fitness function $f(m)$ that is then minimized using SA algorithm. The invention proposes an objective function constructed as a sum of weighted squared terms. The absolute constraints are introduced as the difference between the known link total (from the link traffic table) for the respective direction and the current estimated link total (the sum of respective elements m of the estimated matrix). The soft constraints are also accounted for, in accordance to their assigned weight. Thus, the fitness function becomes:

$$f(m) = p_1(m_{12} + m_{13} + m_{15} + m_{14} - 19)^2 +$$
$$p_1(m_{21} + m_{31} + m_{51} + m_{13} + m_{15} + m_{23} + m_{25} + m_{24} - 39)^2 +$$
$$p_1(m_{31} + m_{32} + m_{51} + m_{52} + m_{34} + m_{54} + m_{15} + m_{25} + m_{35} + m_{45} - 60)^2$$
$$+ p_1(m_{41} + m_{42} + m_{43} + m_{45} - 22)^2 +$$
$$p_1(m_{51} + m_{52} + m_{53} + m_{54} - 21)^2 + p_1(m_{21} + m_{13} + m_{51} + m_{41} - 20)^2 +$$
$$p_1(m_{12} + m_{13} + m_{15} + m_{31} + m_{32} + m_{51} + m_{52} + m_{42} - 38)^2 +$$
$$p_1(m_{13} + m_{15} + m_{23} + m_{25} + m_{43} + m_{45} + m_{51} + m_{52} + m_{53} + m_{54} - 51)^2$$
$$+ p_1(m_{14} + m_{24} + m_{34} + m_{54} - 29)^2 +$$
$$p_1(m_{15} + m_{25} + m_{35} + m_{45} - 23)^2 +$$
$$p_1(m_{11}^2 + m_{22}^2 + m_{33}^2 + m_{44}^2 + m_{55}^2) + p_2(m_{12} + m_{13} + m_{15} - m_{43} - m_{45})^2$$

Next, a starting SD traffic matrix is chosen, denoted with $x_0$. The elements $(x_{ij})$ of this initial matrix are chosen uniformly on minimum:

$(x_{ij})$=min {total traffic leaving node Ni, total traffic arriving at node Nj}

The fitness function for this proposed matrix is then calculated, denoted here with $f(x0)$. Now, an element of this matrix is picked uniformly, i.e. each element is selected with equal probability, using a standard random number generator. This element is then increased or decreased randomly. For example, if when flipping a coin, the coin comes up heads, a '1' is added to the selected element, otherwise a '1' is subtracted.

This change results in a randomly modified SD traffic matrix y, for which the fitness function $f(y)$ is again computed.

If $f(y)<f(x_0)$, then set $x_1=y$.
If $f(y)>f(x_0)$, then generate a uniform random number 'r' between 0 and 1.

$x_n=y$ if $r<\min \{1, \exp e[(f(y)-f(x_{n-1}))/h(n)]\}$ otherwise $x_{n-1}$.

This procedure is iterated a large number of times and when the fitness function is close to 0, this means that the system has arrived to a steady state. The intermediate matrices that are obtained each successive iteration are referred to as temporary SDF traffic matrices. The temporary matrix $x_n$ corresponding to the steady state is accepted as a potential SD traffic matrix that satisfies all the constraints.

These operations are repeated a large number of times, each time recording the resulting matrix as a potential answer.

The collection of these potential matrices is an approximate uniform sample of the set of all possible matrices satisfying the constraints, for the respective associated penalties.

Function h(n) is defined as a sequence function, which depends of the number n of iterations. A geometrically decaying function of the form below is preferably used, but other functions are equally recommendable (i.e. a logarithmic function). When a geometrically decaying function is used:

$$h(n) = \beta \alpha^n$$
$$\beta = \frac{1}{2}$$
$$\alpha = 0.9995$$

The choice of constants $\alpha$ and $\beta$ affects the performance of the SATME (fitness function versus the number of iterations) but a choice as above is often used in practice.

Figure 5:
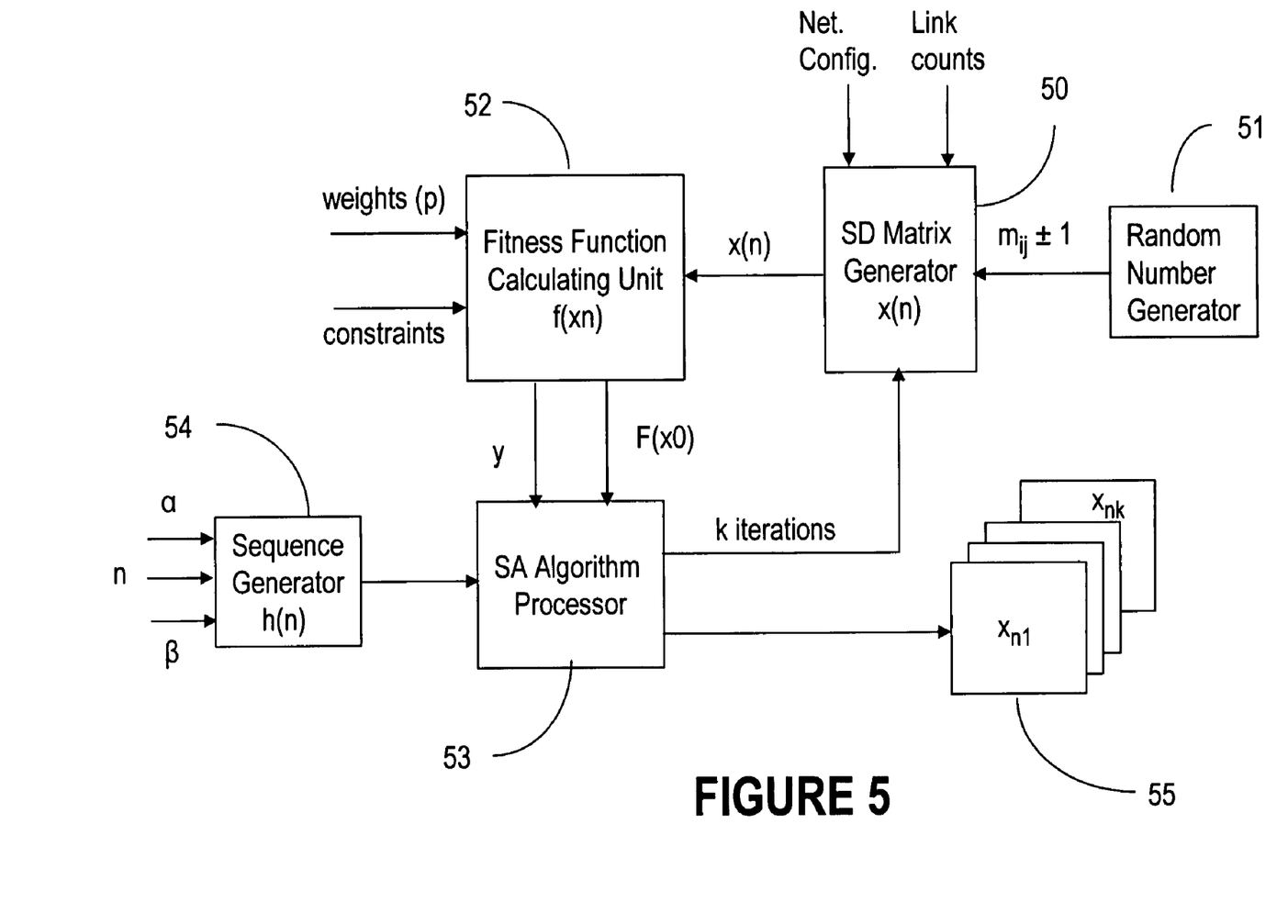
FIG. 5 illustrates a block diagram of the simulated annealing for traffic matrix estimation (SATME) system according to the invention.

FIG. 5 illustrates the SATME system of the invention used for generating a set of potential SD matrices 55. The SATME system includes a SD matrix generator 50, a random number generator 51, a fitness function calculation unit 52, a SA algorithm processor 53, and a sequence generator 54. SD matrix generator 50 generates the starting matrix $x_0$ with the elements chosen uniformly on minimum, based on the known link counts and the known network configuration (number of nodes and the links between the nodes). The fitness function calculation unit 52 calculates the fitness function for the matrices that are presented to it. In this case, in this case it calculates the starting fitness function $f(x0)$ for the starting matrix; as indicated above, $f(m)$ is calculated using the weighted absolute and soft constraints, and is presented to processor 53 for minimization.

The random number generator 51 selects randomly one of the elements of the starting matrix and increases/decreases this element, again randomly. The new value for the selected element replaces the old value, in the starting matrix, resulting in a randomly modified SD matrix, y. The fitness function generator 52 calculates now a new, current fitness function y for the randomly modified SD traffic matrix, and again provides it to processor 53.

SA algorithm processor 53 compares the starting and the current fitness functions and begins minimizing the value of the current function using iterations and, the random number r, according to the sequence provided by the sequence generator 54. Sequence generator 54 uses a selected type of function for the SA algorithm. As above, a geometrically decaying function is preferably selected for generator 54, and the parameters of the function are user-configurable. Also, the number of iterations n is user configurable. When the fitness function is close to 0, the system has arrived to a steady state, and the respective matrix elements m are used for a potential SD matrix $x_n$. These operations are repeated a large number of times, each time recording the resulting matrix as a potential answer.

Returning now to the network 100 in the example used before, let us assume a starting matrix x0 as below.

36 64 18 74 50

21 99 54 65 45

97 24 68 31 15

-continued

```
71  73  85  51  33
90  96  76   2   0
```

Figure 6A:
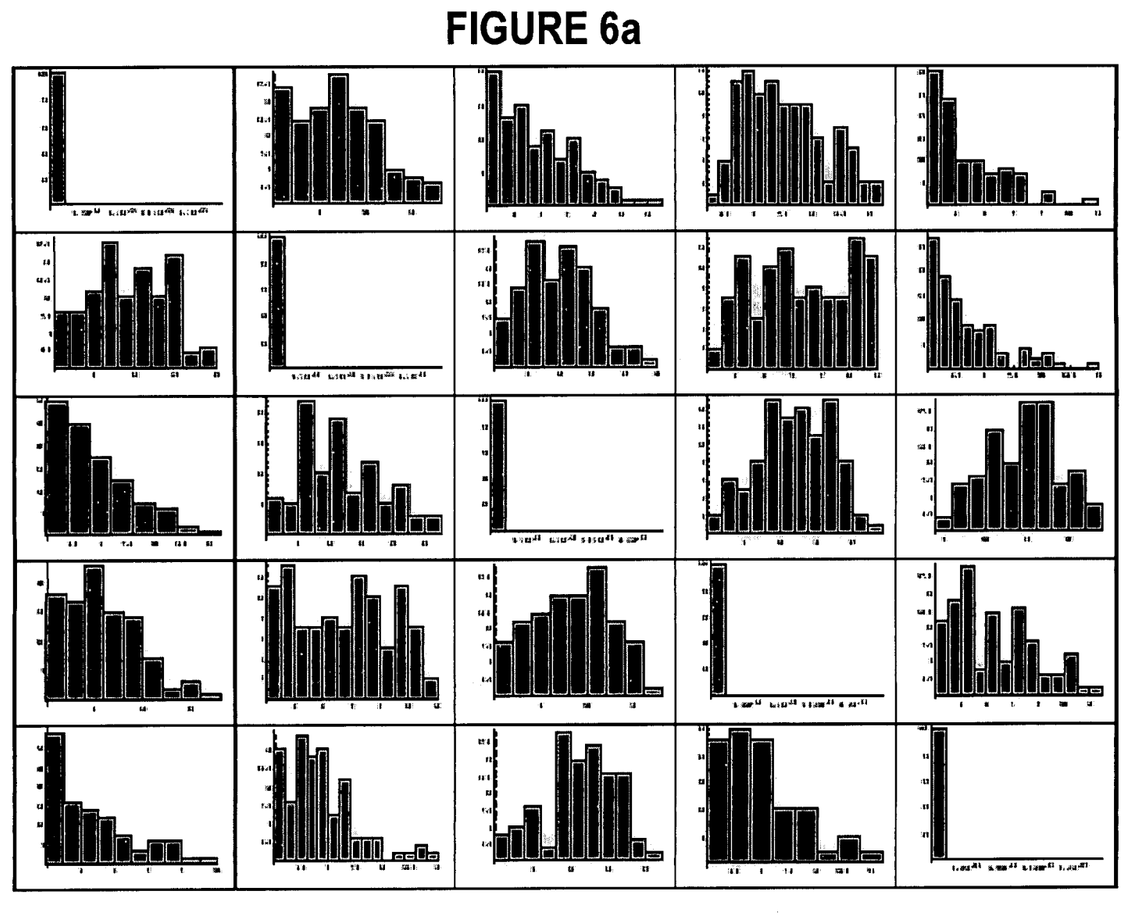
FIG. 6a shows an example of distribution obtained experimentally for the SD matrix of FIG. 4 using the method of the invention.
Figure 6B:
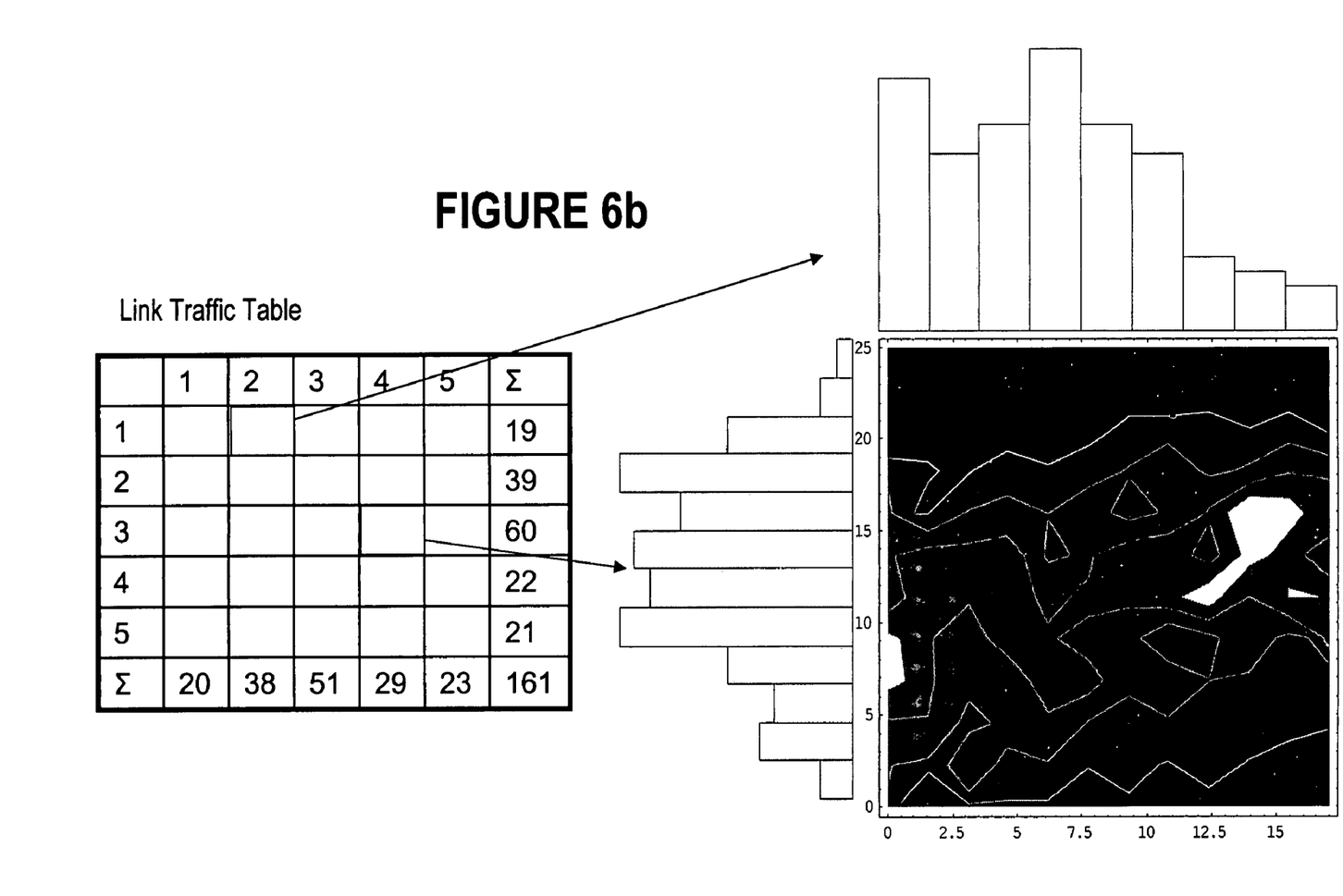
FIG. 6b is an example of the joint distribution between two elements of the matrix of FIG. 4.

After 50,000 iterations, the fitness function became close to 0 and the system arrived at a steady state. FIGS. 6a and 6b show how correlation between two elements of the SD traffic matrix may be obtained after 100 iterations. These figures aim to find the correlation between $m_{12}$ and $m_{34}$. For example, in these graphs, the range of $m_{12}$ is 0 to 17, since in the analysis, the largest value seen for $m_{12}$ was 17, as can be seen from the histogram. Thus, $m_{12}$ is first clamped at 0 and the conditional distribution of $m_{34}$ for this value of $m_{12}$ is determined. Then, $m_{12}$ is changed to 1, and so on, until $m_{12}=17$.

Since the correlation is a linear measure, it may be advantageous to look at the joint distribution between the two elements $m_{12}$ and $m_{34}$, which is shown in FIG. 6b.

case where there are no feasible solutions can be diagnosed by the objective function not converging to zero.

Annex

The code for the algorithm implementing the SATME method is as follows:

```
SA[tt_, its_, temp0_, alpha_, plot_] :=
  Module[{i, pivot, coin, testMatrix, te, t, p},
    t = tt;
    p = Table[0, {its}];
    For[i = 1, i <= its, i++,
      tempi = temp0*alpha^i;
      pivot = {Random[Integer, {1, 5}], Random[Integer, {1, 5}]};
      coin = If[Random[ ] > 0.5, 1, -1];
      testMatrix = t;
      te = testMatrix[[pivot[[1]], pivot[[2]]]] += coin;
```

| $m_{34}/m_{12}$ | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| 0  | 3  | 1  | 0  | 1  | 3  | 1  | 1  | 3  | 1  | 0  | 3  | 0  | 0  | 1  | 0  | 0  | 1  | 0  |
| 1  | 1  | 2  | 3  | 3  | 0  | 2  | 3  | 2  | 5  | 2  | 0  | 0  | 1  | 3  | 1  | 0  | 2  | 1  |
| 2  | 5  | 3  | 2  | 5  | 0  | 5  | 4  | 2  | 1  | 1  | 6  | 1  | 4  | 0  | 2  | 1  | 1  | 1  |
| 3  | 4  | 2  | 5  | 8  | 7  | 2  | 5  | 4  | 4  | 2  | 4  | 1  | 3  | 4  | 1  | 1  | 0  | 0  |
| 4  | 7  | 6  | 9  | 3  | 3  | 6  | 5  | 1  | 5  | 2  | 5  | 3  | 3  | 3  | 0  | 4  | 1  | 1  |
| 5  | 5  | 4  | 5  | 4  | 4  | 5  | 7  | 4  | 4  | 0  | 4  | 4  | 2  | 4  | 6  | 3  | 3  | 3  |
| 6  | 4  | 3  | 5  | 9  | 5  | 4  | 4  | 8  | 6  | 6  | 3  | 3  | 4  | 1  | 2  | 7  | 5  | 3  |
| 7  | 10 | 8  | 7  | 4  | 4  | 4  | 9  | 7  | 7  | 6  | 3  | 7  | 4  | 5  | 4  | 1  | 4  | 2  |
| 8  | 4  | 5  | 8  | 8  | 4  | 8  | 8  | 12 | 7  | 7  | 4  | 5  | 1  | 7  | 1  | 6  | 3  | 4  |
| 9  | 9  | 8  | 5  | 4  | 12 | 6  | 6  | 7  | 5  | 5  | 3  | 2  | 2  | 5  | 6  | 4  | 3  | 8  |
| 10 | 8  | 11 | 7  | 8  | 3  | 3  | 13 | 3  | 3  | 7  | 10 | 6  | 5  | 9  | 4  | 3  | 5  | 6  |
| 11 | 6  | 7  | 8  | 7  | 7  | 7  | 6  | 6  | 9  | 10 | 4  | 5  | 10 | 7  | 6  | 9  | 7  | 9  |
| 12 | 3  | 6  | 5  | 5  | 11 | 9  | 5  | 4  | 5  | 3  | 6  | 14 | 10 | 10 | 6  | 9  | 9  | 4  |
| 13 | 5  | 12 | 11 | 5  | 7  | 9  | 2  | 8  | 9  | 7  | 8  | 12 | 4  | 6  | 12 | 7  | 6  | 10 |
| 14 | 6  | 6  | 4  | 8  | 3  | 10 | 4  | 5  | 2  | 8  | 6  | 6  | 6  | 5  | 8  | 7  | 8  | 3  |
| 15 | 5  | 5  | 9  | 7  | 8  | 3  | 5  | 4  | 5  | 6  | 5  | 3  | 9  | 11 | 10 | 6  | 2  | 10 |
| 16 | 5  | 3  | 0  | 4  | 5  | 4  | 4  | 4  | 5  | 2  | 7  | 4  | 8  | 3  | 11 | 11 | 8  | 7  |
| 17 | 4  | 1  | 3  | 2  | 7  | 5  | 3  | 3  | 8  | 7  | 5  | 6  | 9  | 2  | 7  | 6  | 7  | 8  |
| 18 | 3  | 4  | 1  | 2  | 4  | 4  | 2  | 4  | 3  | 3  | 5  | 6  | 4  | 4  | 5  | 3  | 10 | 5  |
| 19 | 2  | 1  | 1  | 0  | 2  | 2  | 3  | 5  | 4  | 8  | 4  | 3  | 2  | 4  | 3  | 6  | 5  | 9  |
| 20 | 0  | 1  | 2  | 1  | 1  | 0  | 1  | 1  | 2  | 4  | 1  | 5  | 3  | 2  | 3  | 3  | 4  | 2  |
| 21 | 1  | 1  | 0  | 2  | 0  | 1  | 0  | 2  | 0  | 2  | 3  | 2  | 5  | 1  | 1  | 1  | 5  | 1  |
| 22 | 0  | 0  | 0  | 0  | 0  | 0  | 0  | 1  | 0  | 2  | 1  | 1  | 1  | 3  | 1  | 2  | 0  | 2  |

To summarize, the invention adapts the know annealing algorithm by first selecting a plurality of initial solutions uniformly over a larger space of tables. Each element of an initial solution is selected uniformly on [0, m] where m is the minimum of the row and column sums corresponding to the element. Note that the resulting table will (unless we are very lucky) not satisfy any of the constraints (other than non-negativity).

The second adaptation is that we encode all the constraints as components of an objective function, formed as the weighted sum of the squares of the differences between the observed values in the current solution, and the target values (constraints). The weights can be chosen so as to reflect prior beliefs as to the importance of the constraint—thus the row and column sums would have very large weights, and other constraints might have lesser weights. With this methodology, arbitrary constraints of any form can be included, and the -continued

```
      If[te < 0, te = 0,];
      testMatrix[[pivot[[1]], pivot[[2]]]] = te;
      If[fitness[testMatrix] < fitness[t], t = testMatrix,
        If[Random[ ] < Min[1, Exp[(fitness[testMatrix] - fitness[t])/tempi]],
          t = testMatrix,]];
      p[[i]] = fitness[t];
    ];
  Return[t]
  ]
fitness[t_] := Module[
    {ans, p1, p2, c1, c2, c3, c4, c5, c6, c7, c8, c9, c10, c11, c12},
    p1 = 100;
    p2 = 25;
    c1 = (t[[1, 2]] + t[[1, 3]] + t[[1, 5]] + t[[1, 4]] - 19)^2;
    c2 = (t[[2, 1]] + t[[3, 1]] + t[[5, 1]] + t[[1, 3]] + t[[1, 5]] +
        t[[2, 3]] + t[[2, 5]] + t[[2, 4]] - 39)^2;
    c3 = (t[[3, 1]] + t[[3, 2]] + t[[5, 1]] + t[[5, 2]] + t[[3, 4]] +
        t[[5, 4]] + t[[1, 5]] + t[[2, 5]] + t[[3, 5]] + t[[4, 5]] -
        60)^2;
    c4 = (t[[4, 1]] + t[[4, 2]] + t[[4, 3]] + t[[4, 5]] - 22)^2;
    c5 = (t[[5, 1]] + t[[5, 2]] + t[[5, 3]] + t[[5, 4]] - 21)^2;
```

-continued

```
c6 = (t[[2, 1]] + t[[3, 1]] + t[[5, 1]] + t[[4, 1]] − 20)^2;
c7 = (t[[1, 2]] + t[[1, 3]] + t[[1, 5]] + t[[3, 1]] + t[[3, 2]] +
    t[[5, 1]] + t[[5, 2]] + t[[4, 2]] − 38)^2;
c8 = (t[[1, 3]] + t[[1, 5]] + t[[2, 3]] + t[[2, 5]] + t[[4, 3]] +
    t[[4, 5]] + t[[5, 1]] + t[[5, 2]] + t[[5, 3]] + t[[5, 4]] −
    51)^2;
c9 = (t[[1, 4]] + t[[2, 4]] + t[[3, 4]] + t[[5, 4]] − 29)^2;
c10 = (t[[1, 5]] + t[[2, 5]] + t[[3, 5]] + t[[4, 5]] − 23)^2;
c11 = (t[[1, 2]] + t[[1, 3]] + t[[1, 5]] − t[[4, 3]] − t[[4, 5]])^2;
c12 = (t[[1, 1]]^2 + t[[2, 2]]^2 + t[[3, 3]]^2 + t[[4, 4]]^2 +
    t[[5, 5]]^2);
ans =
 p1*(c1 + c2 + c3 + c4 + c5 + c6 + c7 + c8 + c9 + c10) + p2*c11 +
 p1*c12;
Return[ans]]
```

We claim:

1. A method for estimating a traffic matrix for a communication network based on given link counts, comprising the steps of:

a) establishing a fitness function $f(m)$ for the respective network;

b) generating a starting source to destination (SD) traffic matrix and calculating a starting value of the fitness function for the starting SD traffic matrix;

c) modifying the starting matrix to obtain a randomly modified SD traffic matrix and calculating a current value of the fitness function for the randomly modified SD traffic matrix;

d) selecting the SD traffic matrix corresponding to a smaller value of the starting value and the current value as a temporary SD traffic matrix;

e) changing the temporary SD traffic matrix using a simulated annealing algorithm, until the fitness function of the temporary SD traffic matrix reaches a minimum; and f) selecting the temporary SD traffic matrix estimated in step e) as a potential SD traffic matrix and repeating steps b) to e) for a pre-selected number of times, wherein step e) comprises:

generating a uniform random number 'r' between 0 and 1;

determining the elements of the temporary SD traffic matrix as:

$x_n = y$ if $r < \min\{1, \exp[(f(y) - f(x_{n-1}))/h(n)]\}$ otherwise $x_{n-1}$, where $h(n)$ is a sequence function defining the number n of iterations for minimizing the fitness function.

2. A system for estimating a traffic matrix for a communication network comprising:

a source to destination (SD) traffic matrix generator that generates a starting SD traffic matrix based on network configuration data and on link counts collected for each link of the network;

a random number generator that randomly alters the starting SD traffic matrix to obtain a randomly modified SD traffic matrix;

a fitness function calculating unit that determines a starting fitness function and an updated fitness function for said respective SD traffic matrices and selecting the SD traffic matrix corresponding to a smaller value of the starting value and the current value as a temporary SD traffic matrix; and a simulated annealing (SA) algorithm processor that changes the temporary SD traffic matrix until the fitness function of the temporary SD traffic matrix reaches a minimum, and selecting the SD traffic matrix corresponding to the minimum as a potential SD traffic matrix, wherein the simulated annealing algorithm processor uses a sequence generator for determining the number of iterations for attaining the minimum.

* * * * *